May 18, 1965  H. R. BILLETER  3,184,212
ANGLE COCKS
Filed Oct. 22, 1963  2 Sheets-Sheet 1
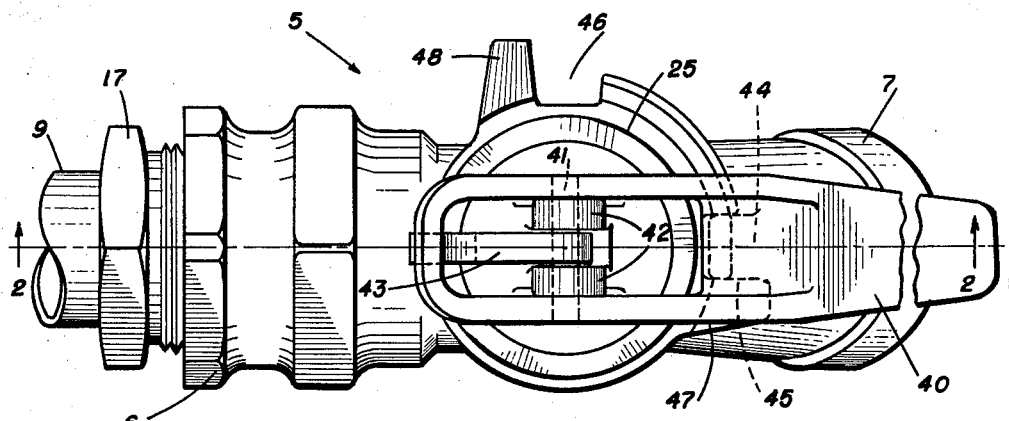
Fig. 1
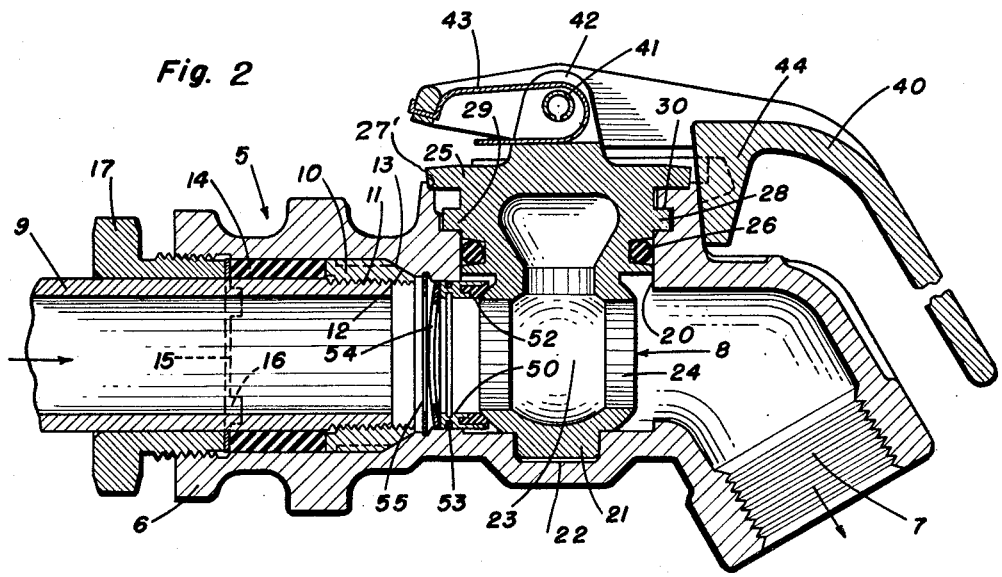
Fig. 2
Fig. 8  Fig. 9
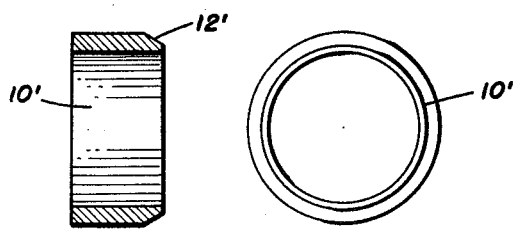
INVENTOR.
HENRY R. BILLETER
BY
PARKER & CARTER
ATTORNEYS May 18, 1965    H. R. BILLETER    3,184,212
ANGLE COCKS Filed Oct. 22, 1963    2 Sheets-Sheet 2

INVENTOR.
HENRY R. BILLETER
BY
PARKER & CARTER
ATTORNEYS

United States Patent Office 3,184,212
Patented May 18, 1965

3,184,212
ANGLE COCKS
Henry R. Billeter, Deerfield, Ill., assignor to Sloan Valve Company, Chicago, Ill., a corporation of Illinois
Filed Oct. 22, 1963, Ser. No. 318,026
10 Claims. (Cl. 251—105)

This invention relates in general to valves but more particularly to an angle cock or valve for controlling air pressure passing through the brake pipe on railway trains.

An object of the invention is to provide an angle cock having new and improved sealing means for the ball valve member.

Another object of the invention is to provide novel sealing means for an angle cock in which the sealing means comprises a single unitary structure serving the dual purpose of sealing tightly against the valve member and against the valve body to prevent outward leakage.

A further object is to provide in an angle cock, novel means for locking and unlocking the rotatable valve member in the valve body facilitating the removal and replacement of the valve member.

It is another object of the invention to provide new and improved connecting means for connecting an air brake pipe with an angle cock.

A further object is to provide novel connecting means between an air brake pipe and the angle cock in which vibrations and shock incurred under service conditions, cannot cause the pipe to become disconnected or result in its rupture due to fatigue or crystallization.

Another object is to provide a novel angle cock assembly in which the parts are all of simple construction, economically produced and readily assembled, and which will be efficient and durable under service conditions as well as positively leak-proof.

The foregoing and other objects including certain combinations of parts and arrangements thereof, will be described hereinafter, particularly set forth in the claims, and illustrated in the accompanying sheets of drawings, forming a part of the specification, which depict a preferred embodiment of the invention, in which:

FIGURE 1 is a top plan view of the device;

FIGURE 2 is a cross sectional side view taken along the line 2—2 of FIGURE 1;

FIGURE 7 is a perspective view of a friction ring; while

FIGURES 8 and 9 are side and end views of a modified form of pipe adapter.

Figure 4:
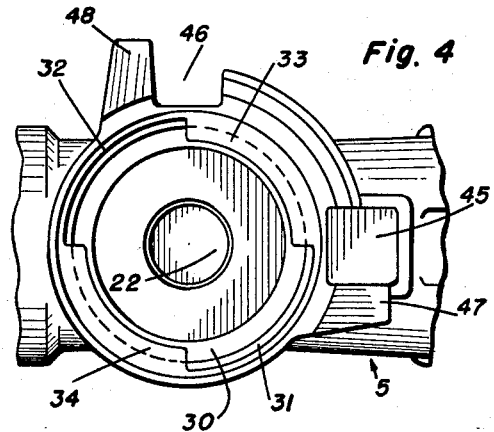
FIGURE 4 is a fragmentary portion showing a top view with the operating handle and valve unit removed.

Referring to FIGURES 1 and 2, the angle cock or valve comprises generally a body portion 5 having an inlet end 6 and a threaded outlet 7 with a ball shaped valve member indicated generally at 8 for controlling the air flow through the valve. The outlet 7 connects with the usual flexible hose connection between two railway cars while the inlet 6 connects with the rigid air pipe 9 extending throughout the length of the railway car.

Figure 7:
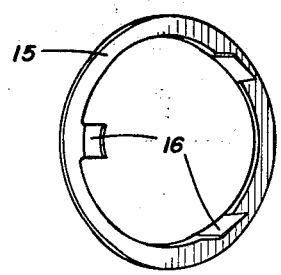

In the assembly of the connection, a pipe adapter 10 sleeve shaped, having internal pipe threads 11, is threaded on the end of the air pipe 9 and inserted into the inlet end 6 of the valve. A tapered end 12 of the pipe adapter 10 butts against a beveled shoulder 13 formed in the valve body 5. The adapter 10 has several wrench flats on it to facilitate its attachment to pipe 9. A flexible packing sleeve 14 is slid over pipe 9 and butted against the end of the pipe adapter 10 in the position shown. This packing sleeve 14 may be formed of any suitable flexible material such as rubber or plastic and is of a thickness to fit snug between the internal inlet surface of the valve body inlet 6 and around the outside surface of the pipe 9. A metal friction ring 15 (FIGURE 7) is next placed against packing sleeve 14 around pipe 9 and is provided with prongs 16 which imbed into the sleeve 14 and keep the ring 15 from being rotated. A lock nut 17 then is slid over pipe 9 and threaded into the valve inlet 6 against friction ring 15. The nut 17 slides on the friction ring 15 without rotating it as the nut is tightened up.

Tightening up lock nut 17 into valve body inlet 6 squeezes the packing sleeve 14 so it expands tightly against the inner walls of the body inlet 6 and around the outside of the air pipe 9 producing a tight seal against leakage of air from the interior of the valve body 5 to the outside of the pipe connection 9. As a further result of the tightening of lock nut 17, the tapered end 12 of pipe adapter 10 is held tight against body shoulder 13 thereby solidly anchoring the end of pipe 9 in the valve body and preventing withdrawal of the pipe.

The foregoing novel construction represents certain features highly desirable in practice when installed under service conditions on railway cars. The air pipe 9 is more securely supported and locked in place on the valve body than heretofore. It cannot be pulled out inadvertently as from shocks or vibrations occurring during such service operations. Neither can it be blown out since the combination of the lock nut 17 and squeezed flexible sleeve 14 securely anchors and locks it in place as well as provides a leak-proof seal. An important advantage is that due to the flexible construction and arrangement, the iron pipe 9 will not become cracked or broken by the constant vibration of the equipment as often happens. Neither will fatigue or crystallization of the metal pipe be apt to take place under these conditions since the flexible sleeve 14 serves to absorb these vibrations. The connection however can be readily pulled apart when the lock nut 17 is backed off.

FIGURES 8 and 9 show a modified form of pipe adapter 10 in which there are no internal threads for the air pipe 9 to screw into. The parts are all held tightly in leak-proof engagement when the lock nut 17 is threaded into the valve body against flexible sleeve 14 to squeeze the same and the pipe 9 therefore cannot be pulled out. This arrangement is practical where the end of the pipe 9 is not threaded as it may be in some instances.

Figure 5:
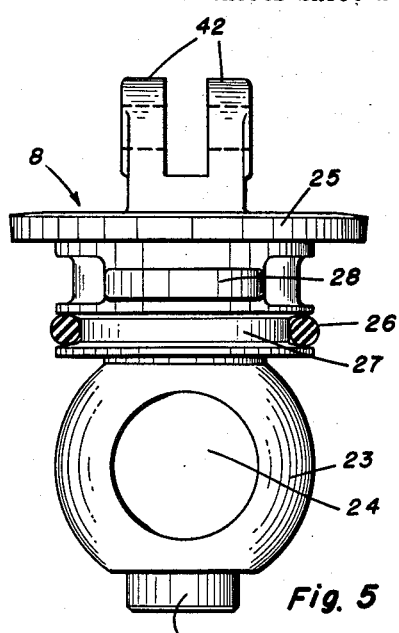
FIGURE 5 is a full side view of the valve member with its supporting parts.
Figure 3:
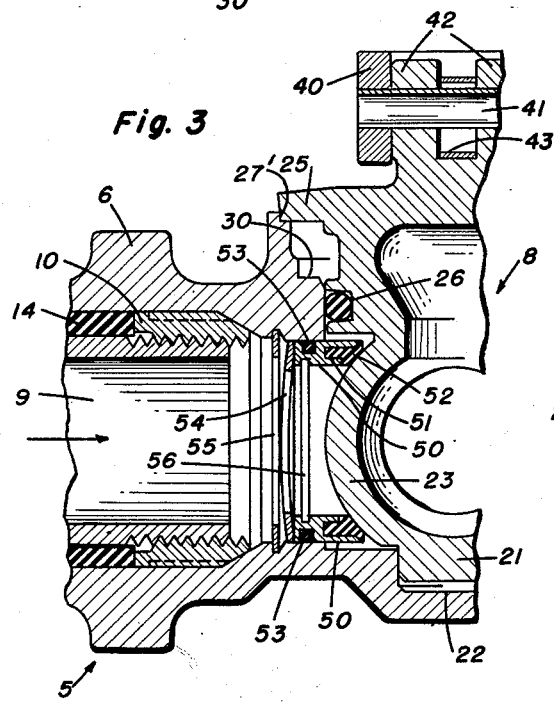
FIGURE 3 is an enlarged view of a fragmentary portion of the device shown in the valve closed position.
Figure 6:
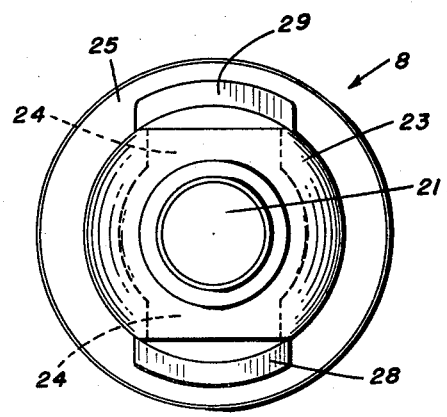
FIGURE 6 is a bottom view of FIGURE 5.

The valve member indicated generally at 8 and more specifically in FIGURE 5 consists of a single unitary structure inserted into the bore 20 of the valve body 5, the bottom end 21 being journaled in the body recess 22. The valve 23 is of hollow ball shape and has a transverse passage 24 therethrough which is rotatable in the bore 20 for controlling the passage of air through the valve body. The bonnet 25 of the ball unit closes the top opening of the bore 20 and an O-ring seal 26 set in recess 27 in the bonnet prevents leakage outward through the top of the valve body while permitting easy rotation of the ball valve 23. The flat bonnet portion 25 is rotatable in the recess 27' in the top of the valve body.

The valve unit 8 is removably held in the body 5 by means of locking lugs 28 and 29 formed on opposite sides of the unit 8 which are adapted to be rotated in the annular groove 30 formed in the top of the valve body. When the valve unit 8 is inserted in the valve bore 20 the lugs 28 and 29 are placed in position in register with the slots or recesses 31 and 32 shown in FIGURE 4, and then the valve unit 8 is rotated 155 degrees clockwise until the lugs 28 and 29 are positioned under the flanges 33 and 34 formed in the body. The valve unit 8 is thereby locked in the position in the valve body as seen in FIGURES 1 and 2.

The handle 40 for opening and closing the valve is arranged for up and down movement about pin 41 journaled in a pair of upstanding lugs 42 formed at the top of the valve bonnet 25. A leaf spring 43 normally biases the handle end 40 downward. The valve handle 40 is locked in valve open position by a lug 44 formed under the handle, and resting in a recess 45 formed in the top of the valve body. To close the valve, the handle 40 is tilted upward against the tension of spring 43, then rotated 90 degrees counter-clockwise and when the handle is released, the handle lug 44 drops into a recess 46 in the body. The spring 43 holds the handle 40 positively locked in any of its positions against vibration of shocks produced under service conditions, while the stops 47 and 48 formed on the valve body limit rotation of the handle 40 within the 90 degree movement.

When it is necessary to remove the valve unit 8 from the valve body 5, the pivot pin 41 is first driven out and removed, enabling the handle 40 to be taken off the top of the unit. It is then possible to rotate the valve unit 8 counter-clockwise with a tool placed between lugs 42, to a position beyond that occupied by the stop lug 48. In this position, the locking lugs 28 and 29 are removed from the confines of the recesses 31 and 32 whereupon the valve unit 8 may be withdrawn directly from the valve body 5. This arrangement insures that the valve member 8 cannot be removed or the valve interior damaged by unauthorized persons. Prior to the above action, however, it will be understood and assumed that the valve sealing means, about to be described, has first been removed from the valve body through the body inlet 6.

An important feature of the present invention resides in the sealing means between the ball valve member 23 and the valve body 5, to prevent outward leakage and loss of air pressure from the air pipe 9. This sealing means includes an assembly consisting of a rigid annular supporting packing sleeve or collar 50 which is insertable through the inlet side 6 of the valve body. This sleeve 50 has an annular recess 51 in which there is suitably secured as by an adhesive, an annular sealing ring 52. This sealing ring 52 may be made of any flexible material such as rubber and bears directly upon the outer surface of the ball valve member 23 in all positions in which the valve member 23 may be rotated; that is in either the valve open or closed positions. The sleeve 50 slides freely into the body inlet 6 and has an O-ring 53 imbedded in its outer edge which bears against the inner surface of the body inlet and thereby effectively seals the same from escape of air outward through the bonnet 25 or through the outlet 7. The seal 52 serves a similar purpose together with the bonnet seal provided by the O-ring 26.

The packing sleeve 52 of the unit 50 is pressed into tight engagement with the surface of ball valve member 23 in all positions by a bowed ring-shaped spring 54 in turn held in position in the body inlet 6 by a retaining ring 55. Retaining ring 55 may be of the split washer type which snaps into an annular recess formed in the inlet of the valve body. A second ring such as 55 may be added if greater sealing pressures are required. The inner surface of sleeve 50 has a groove 56 formed therein into which a tool may be inserted to remove the sleeve outward through the inlet 6.

The foregoing sealing arrangement insures that at all times, leakage of air outward is prevented by the sealing ring 52 being constantly pressed into intimate and tight engagement with the ball valve member 23, under conditions of extreme vibration, shock, and temperature changes. Due to the action of spring washer 54 tight sealing is maintained and wear is automatically compensated for. The valve member 8 is rotatable easily and accurate control of air release is provided. The seal presents no obstruction to free air flow through the valve. The construction also permits quick and easy assembly of the parts, and the valve can be readily taken apart for repair or replacement.

What is claimed is:

1. In an angle cock, a body having an inlet and an outlet flow passage therethrough and a ball valve member in said body for controlling said flow passage, said ball valve member rotatable in said body and having a bonnet thereon, an operating handle on said bonnet for rotating said ball valve member, a pair of oppositely disposed lugs on said bonnet, said angle cock body having oppositely disposed recesses formed therein to accommodate said bonnet lugs, a pair of oppositely disposed flanges formed in said angle cock body, said bonnet lugs adapted to be inserted in said body recesses and upon rotation of said bonnet, said bonnet lugs are moved under said flanges whereby said bonnet and ball valve member are locked in said angle cock body.

2. In an angle cock, a body having an inlet and an outlet flow passage therethrough and a ball valve member in said body for controlling said flow passage, said ball valve member being rotatable in said body and having a bonnet thereon, an operating handle on said bonnet for rotating said ball valve member in said body, cooperating lugs and flanges formed on said bonnet and said body for locking said bonnet to said body while permitting rotary movement of said ball valve member, other cooperating lugs and recesses formed in said body and said operating handle for locking said operating handle in either of the positions in which it rotates said ball valve member, and spring means for biasing said operating handle in its locked position.

3. In an angle cock, a body having an inlet and an outlet flow passage therethrough and a ball valve member in said body for controlling said flow passage, said ball valve member being rotatable in said body and having a bonnet thereon, an operating handle on said bonnet for rotating said ball valve member in said body to open and close the flow passage, said bonnet having oppositely disposed lugs formed thereon, said body having oppositely disposed recesses to accommodate said bonnet lugs, oppositely disposed flanges formed on said body between said body recesses, said bonnet lugs adapted to be inserted in said body recesses and upon rotation of said operating handle, said bonnet lugs are rotated in said recesses into position under said flanges to lock said bonnet on said body, other lugs formed on said body engaged by said operating handle for limiting the movement of said operating handle between ball valve member open and closed flow positions, means for locking said operating handle in either of its operated positions, spring means for biasing said operating handle in either of its locked positions, and means for preventing removal of said bonnet and ball valve member from said body in either of the operating handle positions.

4. The structure claimed in claim 3 in which the operating handle is pivoted on said bonnet, and to remove the bonnet and ball valve member from the body, the pivot and handle are first removed from the bonnet, whereupon said bonnet can be rotated until said body recesses are in register with said bonnet lugs.

5. The structure claimed in claim 3 in which the means for preventing removal of said bonnet and ball valve member comprises a stop lug on said body engageable by said operating handle in one of its positions, said bonnet and ball valve member being removable from said body by disconnecting said operating handle from said bonnet whereby said bonnet can be rotated beyond one of its positions to place said bonnet lugs in registry with said body recesses to permit withdrawal of said bonnet and ball valve member from said body.

6. In an angle cock for connection with a fluid source, a valve body having an inlet and an outlet flow passage connected therethrough and a ball valve member in said body, controlling said passages, said ball valve member being rotatable about an axis transverse to the path of fluid through said body, means for normally holding the ball valve member against movement along its axis while permitting a predetermined movement of the ball valve member about said axis, and means for releasing said ball valve member for removal, along said axis, from the valve body, said ball valve member having an outer spherical surface, sealing means in the inlet passage for maintaining a sealing contact with said spherical surface and with the inner surface of the inlet passage, said sealing means being removable through said inlet passage, whereby to permit removal of the ball valve member from the valve body.

7. The structure of claim 6 characterized in that the sealing means includes a compressible seal member abutting the spherical surface and a flexible seal member abutting the inner surface of the inlet passage.

8. The structure of claim 6 characterized by and including yielding means for thrusting the sealing means against the spherical surface, said yielding means being removable outwardly through the inlet passage.

9. In an angle cock for connection with a fluid source, a valve body having an inlet and an outlet flow passage connected therethrough and a ball valve member in said body, controlling said passages, said ball valve member being rotatable about an axis transverse to the path of fluid through said body, means for normally holding the ball valve member against movement along its axis while permitting a predetermined movement of the ball valve member about said axis, and means for releasing said ball valve member for removal, along said axis, the means for normally holding the ball valve member against movement along its axis including outward projections from said ball valve member, said valve body being recessed to receive said projections, the means for releasing the ball valve member for movement along its axis including means for imparting to the ball valve member a rotation effective to release the projections on the valve member from the recesses in the body, and means for normally limiting the movement of the ball valve member between the open and closed position to a movement effective to maintain the locking relationship between the projections on the ball valve member and the recessing of the valve body.

10. In an angle cock, a body having an inlet and an outlet flow passage therethrough and a ball valve member in said body controlling said flow passage, an annular sleeve in said passage having an annular sealing member supported thereon in frictional engagement with said ball valve member in all positions thereof, a second annular sealing member supported on said annular sleeve in frictional engagement with said inlet passage, spring means in said inlet passage bearing against said annular sleeve to normally apply sealing pressure to said first sealing member against said ball valve member, a retaining ring in said inlet passage for supporting said spring means, said retaining ring comprising a split washer, and said spring means a bowed washer arranged between said retaining ring and said annular sleeve, said annular sleeve having an inner annular groove formed therein for application of a tool to enable said annular sleeve to be withdrawn from said inlet passage.

References Cited by the Examiner

UNITED STATES PATENTS

| | | | |
|---|---|---|---|
| 2,839,074 | 6/58 | Kaiser | 137—315 |
| 2,877,979 | 3/59 | Snyder | 251—174 |
| 2,925,241 | 2/60 | Baldwin | 251—174 X |
| 2,973,182 | 2/61 | Gill | 251—174 |
| 3,112,758 | 12/63 | Norton | 251—288 X |
| 3,118,649 | 1/64 | Allen | 251—315 |

FOREIGN PATENTS 550,758  1/43  Great Britain.

M. CARY NELSON, *Primary Examiner.*